United States Patent Office 3,487,933
Patented Jan. 6, 1970

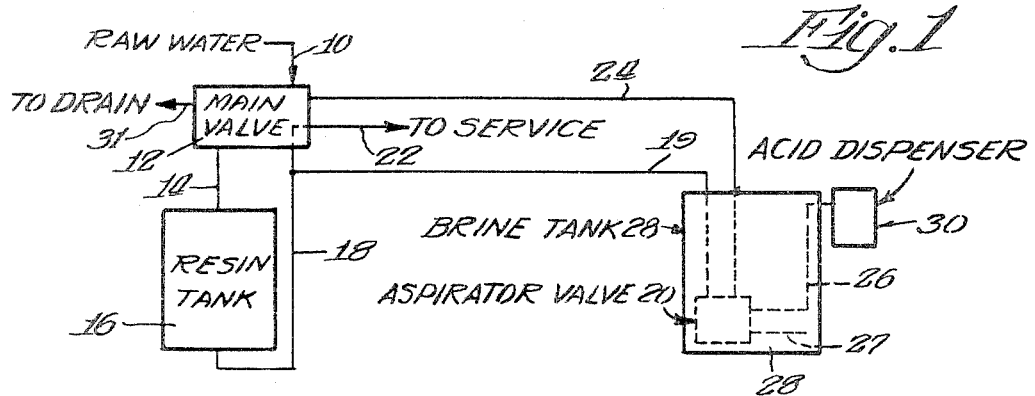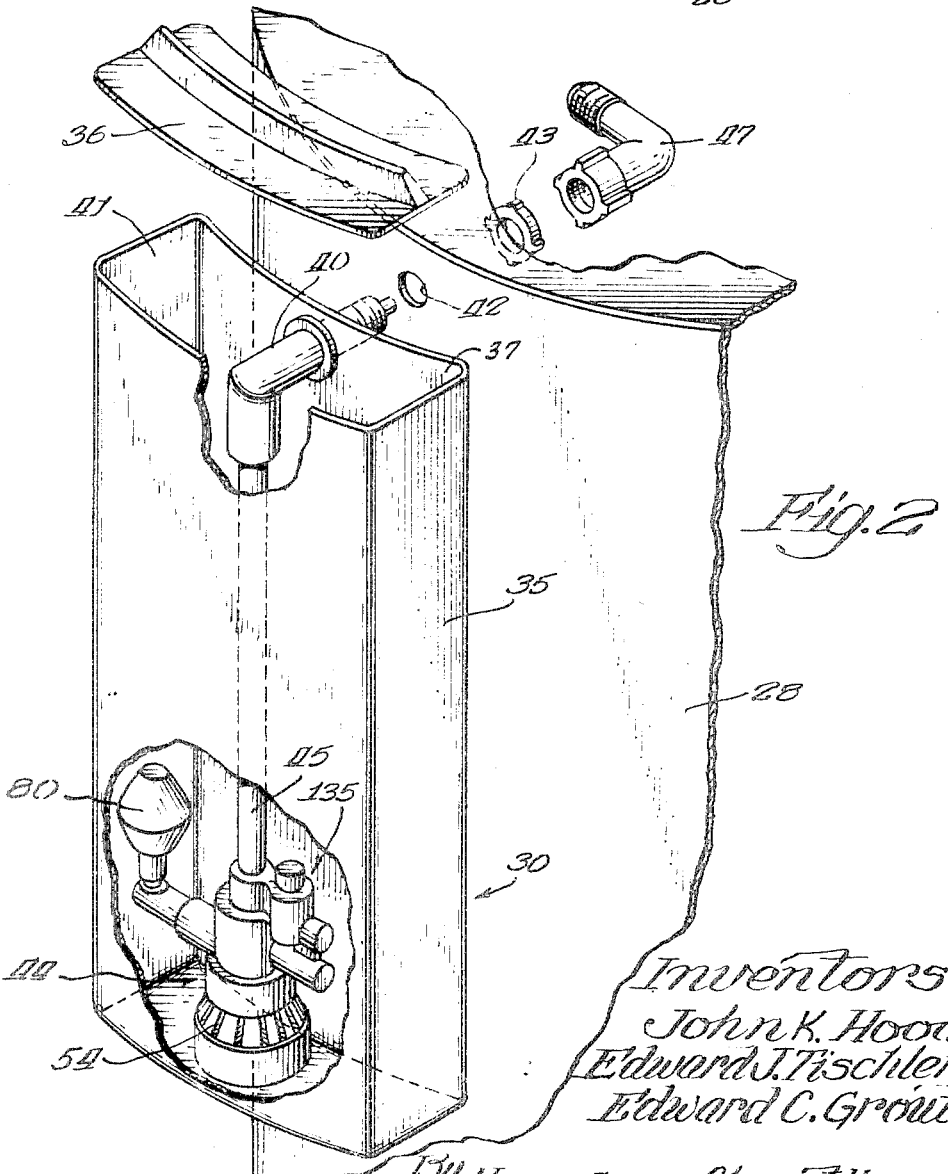

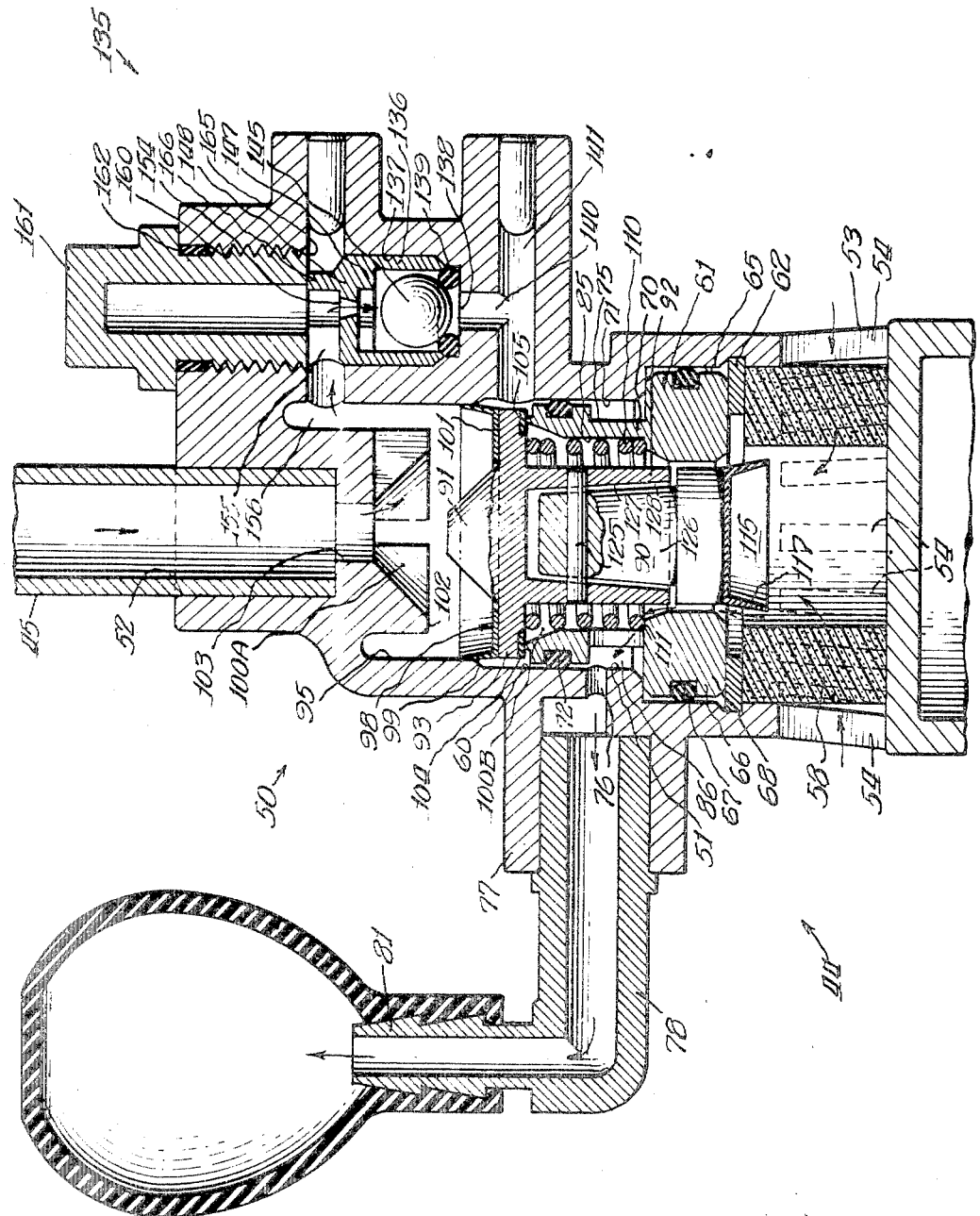

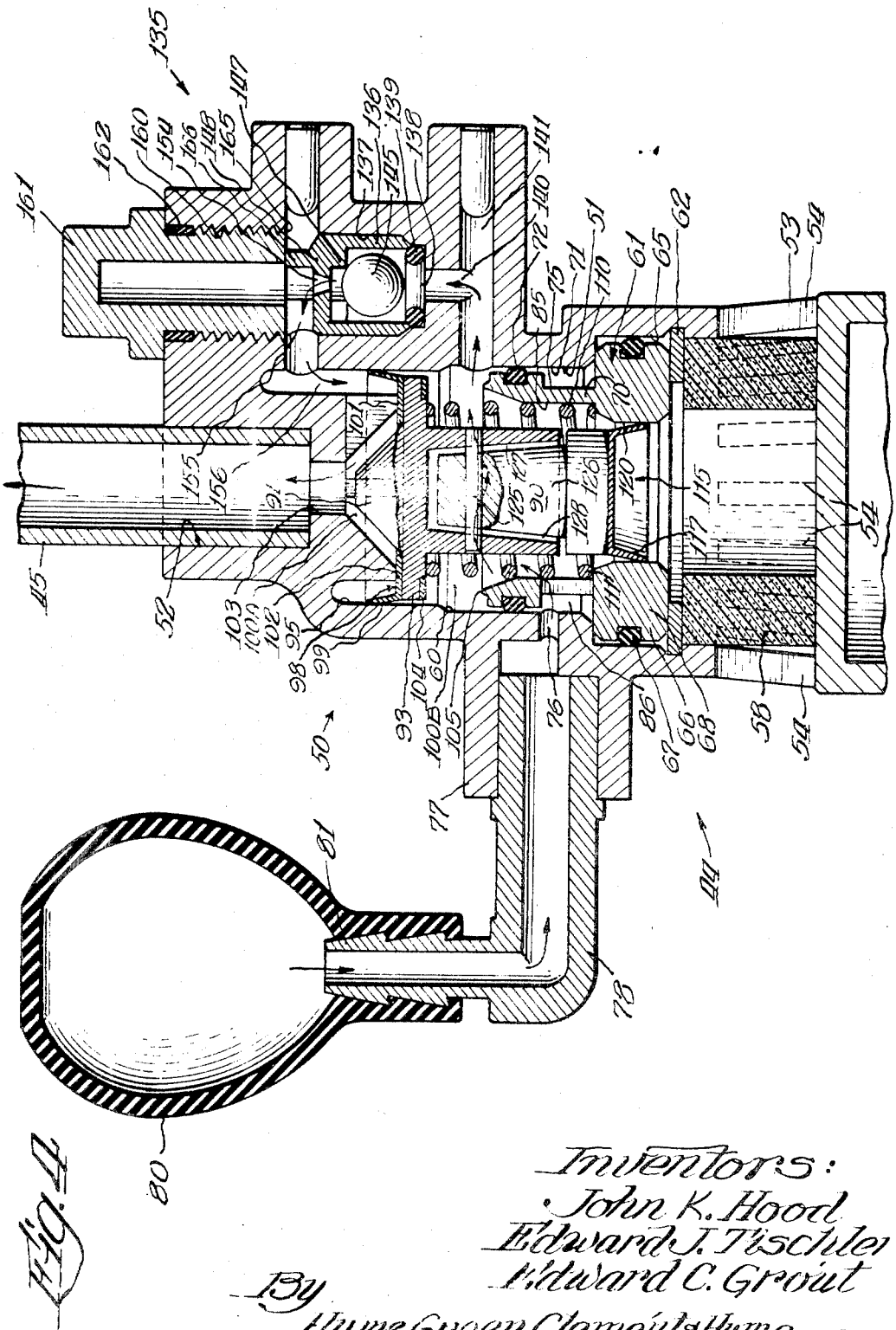

3,487,933
ACID DISPENSER FOR WATER SOFTENER
John K. Hood and Edward J. Tischler, St. Paul, and Edward C. Grout, White Bear Lake, Minn., assignors, by mesne assignments, to Union Tank Car Company, a corporation of Delaware
Filed Sept. 12, 1966, Ser. No. 578,835
Int. Cl. C02b 1/76
U.S. Cl. 210—134                    9 Claims

ABSTRACT OF THE DISCLOSURE

A valve arrangement for metering acid solution into the regeneration process in a water conditioning system. The valve arrangement includes a squeeze bulb metering chamber and is immersed in the acid reservoir. Acid solution is initially drawn into the metering chamber by squeezing and releasing the bulb. Subsequently, slight pressure differentials in the acid supply line effect operation of two members to supply acid solution to the line during the systems regeneration cycle and refill the metering chamber during the service cycle.

---

This invention relates in general to water treatment. It deals more particularly with a valve arrangement for an acid dispenser in a water conditioning system.

Water softening with ion exchange resin particles is well-known in the art. After prolonged contact of the resin particles with raw water during a service cycle, these resin particles lose a substantial portion of their ability to remove hardness inducing ions from the raw water. Accordingly, they are normally regenerated by effecting contact of the resin particles with a brine solution.

Recently, however, it has been found that improved regeneration of the resin particles can be achieved by contacting them with an aqueous acid solution, such as citric acid or the like, in addition to the brine solution. Either a sequential process may be employed or the resin particles may be simultaneously contacted with the acid solution and the brine solution. In any event, an acid dispensing unit of one type or another is required to dispense the aqueous acid solution for future use in the regeneration cycle.

In general, acid dispensing units presently employed have a reservoir chamber containing a supply of acid solution and, in addition, a separate metering chamber. The acid dispensing unit is connected to a line which is under a relatively high pressure during the service cycle and under a relatively lower pressure during the regeneration cycle. During the service cycle, acid solution passes from the reservoir chamber to the metering chamber where a predetermined amount of the acid solution is isolated. During the regeneration cycle, the acid solution in the metering chamber is discharged to a line through which it passes into contact with the resin particles. The dispensing unit incorporates a valve arrangement which allows the acid solution to pass from the reservoir chamber to the metering chamber during the service cycle, and then allows the acid solution in the metering chamber to pass to the aforementioned line during the regeneration cycle.

It is an object of the present invention to provide an improved acid metering and dispensing valve arrangement for a water conditioning system which offers low resistance to acid flow.

It is another object to provide an improved acid dispensing and metering valve arrangement which incorporates new and improved metering means.

It is still another object to provide a valve arrangement which is extremely sensitive and responsive to prescribed pressure differentials in the system.

It is yet another object to provide a valve arrangement wherein positively effective operation of the valve is afforded during each phase of the system's cyclical water treatment.

The foregoing and other objects are realized in accord with the present invention by providing an acid dispensing and metering valve arrangement having a primary valve and a secondary valve, both operated by slight differentials in water line pressure, and a metering container or chamber. The primary valve controls the influx of acid solution from the reservoir chamber to the metering chamber. The primary valve and the secondary valve cooperate in controlling the efflux of acid solution from the metering chamber to the dispensing line. The secondary valve includes a light ball core which is lifted off its seat by a very slight vacuum (pressure less than atmospheric pressure) in the line. On the other hand, a very slight positive pressure in the line immediately seats the light ball core on a valve seat. According to the present invention, a jet of liquid is directed at the ball core as positive pressure is applied to assist in seating the core.

The invention, both as to its organization and method of operation, taken with further objects and advantages thereof, will best be understood by reference to the following description, taken in conjunction with the accompanying drawings, in which:

FIGURE 1 is a schematic diagram of a water conditioning system wherein water is treated with ion exchange resin particles which are regenerated by an acid solution and a brine solution, the acid solution being supplied from an acid dispenser unit utilizing a valve arrangement embodying features of the present invention;

FIGURE 2 is a perspective view of the acid dispensing unit, with parts broken away to illustrate the valve arrangement;

FIGURE 3 is an enlarged sectional view taken through the valve arrangement illustrated in FIGURE 2, as it would appear during the normal service cycle of the water conditioning system; and FIGURE 4 is a sectional view similar to FIGURE 3, illustrating a valve arrangement as it would appear during the regeneration cycle of the system.

Referring now to the drawings, and particularly to FIGURE 1, there is schematically illustrated a water conditioning system for treatment of water with ion exchange particles. During the system's service cycle, raw water from a suitable source is passed through a feed line 10 to a main valve 12. The valve 12 directs the raw water through a line 14 to a resin tank 16 which contains a conventionally deployed bed of ion exchange resin particles. The raw water passes through the bed of ion exchange particles and is treated. Treated water is withdrawn from the tank 16 through a line 18 to the main valve 12, which directs it to a service line 22.

After a predetermined quantity of raw water has passed through the resin tank 16, the ion exchange resin particles lose a substantial portion of their capacity to soften the raw water and must be regenerated. This regeneration is effected by contacting the exhausted resin particles with an acid solution and a brine solution.

A regeneration cycle is initiated by actuating the main valve 12 so that a portion of the raw water from the line 10 is directed to the service line 22. In this manner, a supply of water is maintained to the service line during the regeneration cycle. The remainder of the raw water is directed by the main valve 12 through a line 24 into an aspirator valve 20. As the raw water passes through the aspirator valve 20 in this direction, a partial vacuum, i.e. a pressure less than atmospheric pressure, is created in the lines 26 and 27.

The line 27 communicates with the interior of a brine tank 28 in which the aspirator valve 20 is suitably mounted. The line 26 communicates with an acid dispensing unit 30 embodying features of the present invention mounted on the tank 28, in the present illustration on the outside although it could also be inside. By virtue of the partial vacuum or low pressure created in the lines 26 and 27, a brine solution is drawn from the brine tank 28 and a metered amount of acid solution is drawn from the acid dispensing unit 30.

The acid solution and the brine solution enter the aspirator valve 20 and pass through a line 19 into the valve 26 and and through line 18 into the resin tank 16. After passing upwardly through the bed of resin particles in the tank 16, and thereby regenerating the particles, the acid solution and brine solution are passed to drain through a line 31 after passing through the line 14 and the main valve 12.

When regeneration of the resin particles is complete, the regeneration cycle is terminated by automatic actuation of the main valve 12 and the service cycle re-initiated. Raw water again passes through the line 14, the tank 16, and the line 18, and the main valve 12 to the service line 22. During this serivce cycle some of the treated water passes through the line 19 and the aspirator valve 20 to the line 27 to supply makeup water to the brine tank 28 in a manner well known in the art.

At the same time, treated water at a relatively high pressure, i.e. greater than atmospheric pressure, enters the line 26 from the aspirator valve 20. According to the present invention, and in a manner which will hereinafter be more fully discussed, the relatively high pressure of the treated water in the line 26 causes the acid dispensing unit 30 to meter another predetermined amount of acid solution during the service cycle so that the acid dispensing unit 30 is ready to discharge this acid solution to the line 26 during the regeneration cycle. The partial vacuum or low pressure which is effective in the line 26 during the regeneration cycle actuates the acid dispensing unit 30, causing it to dispense the amount of acid solution which has been metered during the service cycle.

Referring now to FIGURE 2, the acid dispensing unit 30 is seen to include a vertically elongated container 35 contoured to fit snugly against the side of the generally cylindrical brine tank 28. The container 35 is preferably fabricated of a suitable plastic and has a cover 36 designed to rest on and close the open top 37 of the container.

The container 35 is secured to the side wall of the brine tank 28 by a threaded fitting 40 extending through the inner wall 41 of the container and through a suitably formed aperture 42 in the side wall of the brine tank. An internally threaded nut 43 inside the brine tank 28 threads on the fitting 40, holding both the fitting and the container 35 against the side of the brine tank.

As will be recognized, the fitting 40 is actually in communication with an acid dispensing and metering valve arrangement 44, embodying features of the present invention, through a vertically disposed tube 45. The valve arrangement 44 itself is seated on the bottom of the container 35. The fitting 40 is, in turn, joined inside the brine tank 28 with a fitting 47 forming a disconnectable terminus for the line 26 from the aspirator 20.

Turning now to FIGURES 3 and 4, the valve arrangement 44 is seen to comprise a vertically disposed, irregularly shaped valve body 50 preferably fabricated in one piece of molded plastic. A vertically extending, stepped bore 51 extends entirely through the body 50.

The upper circular cylindrical section 52 of the bore 51 has the lower end of the tube 45 seated in it in interference fit, fluid tight relationship. The lowermost end of the bore 51 is actually formed by a skirt 53 on the body 50 having a series of radially disposed slots 54 formed therein. The skirt 53 rests on a raised platform on the bottom of the container 35. A ring 58 of open cell foam plastic seats within the skirt 53 and acts as a filter for acid solution entering the valve arrangement 44 in a manner hereinafter discussed.

The bore 51 further includes an enlarged, generally cylindrical central section 60 in which the main valve assembly 61 is seated. A special plastic snap ring 62 seated in the largest diameter lower portion 65 of the central bore section 60 retains the valve assembly 61 in place.

The valve assembly 61 comprises a collar 66 resting on the ring 62. An O-ring 67 encircles the base 68 of the collar 66 in sealing relationship with the lower portion 65 of the bore section 60. Extending upwardly from the base 68 of the collar 66 is a neck 70. The neck 70 is disposed in a smaller diameter intermediate portion 71 of the central bore section 60. An O-ring 72 encircles the upper periphery of the neck 70 in sealing relation with the intermediate portion 71 of the central bore section 60.

Immediately below the O-ring 72 an annular channel 75 is formed in the outer surface of the neck 70. A radial port 76 through the body 50 of the valve 44 places the channel 75 in continuous communication with a radial fitting 77 formed unitarily with the protruding outwardly from the body 50. An elbow tube 78 is seated in fluid tight relationship in the fitting 77, and mounts a conventional rubber squeeze bulb 80 on its free end 81. It is the bulb 80 which acts as a metering device in operation of the valve 44 according to the present invention, in a manner hereinafter discussed in detail.

The annular channel 75 in the outer surface of the neck 70 also is in communication with a central passage 85 in the collar 66 through a radial aperture 86 in the neck. A valve core 90 is suitably mounted in the passage 85 for movement between a first or lower position during the normal "service" cycle of the water conditioning system, and an upper or second position during the "regeneration" cycle of the system. FIGURE 3 is illustrative of the service cycle position and FIGURE 4 of the regeneration cycle position.

The valve core 90 comprises a cap 91 and a stem 92. An annular rim 93 on the cap 91 has a diameter only slightly less than that of the upper portion 95 in the valve body's central bore section 60. To maintain a fluid tight sliding fit between the rim 93 and the bore portion 95, an annular gasket 98 of rubber or the like is bonded on the rim in a well known manner so that its flexible cup lip 99 is forced into sealing relationship with the upper bore portion by liquid pressure developed in the bore 95 above the cap 91. The sealing lip 99 thus effectively defines an upper chamber 100A in the bore 51 above the rim 93 and a lower chamber 100B below it.

The gasket 98 also includes an upper ring pad 101 which is adapted to seat against an annular seat 102 encircling the port 103 providing communication between the chamber 100A and the tube 45. When the ring pad 101 is seated against the valve seat 102, the valve core 90 is in its upper or second position, as will be recognized.

A lower ring pad 104 of the gasket 98 is adapted to seat against the annuar seat 105 defined by the upper edge of the neck 70 when the valve core 90 is in its lower or first position. A conventional coil spring 110 is seated within the confines of the neck 70 on the retainer collar 66 in surrounding relationship with he valve core 90 and provides a constant force biasing the valve core towards its uppermost position. The coil spring 110 is seated between a shoulder 111 on the base 68 of the collar 66 and the underside of the rim 93 on the valve core cap 91.

On the lower end of the valve core stem 92 is mounted a gasket seal 115. The gasket 115 is secured to the bottom of stem 92 by a well known bonding method and has a flexible cup lip 117. The lip 117 engages the annular inner periphery 120 of the collar base 68 in sealing relationship when the valve core 90 is in its upper position, as illustrated in FIGURE 4.

It is thus seen that the valve core 90 is adapted to provide a sealing effect at the annular lips 99 and 117. To assure that effective sealing is accomplished each time the valve core 90 moves from its lower position to its upper position, and vice versa, the cap 91 and stem 92 of the valve core are fabricated separately and connected together by a transvese pin 125 for limited relative pivotal movement about the pin, in accommodation of valve seat irregularities and slight off center-line movement of the core 90.

As will be seen in FIGURES 3 and 4, a male peg 126 of the stem 92 extends upwardly into a female well 127 of the cap 91. The pin 125 pivotally joins them through suitably aligned transverse apertures of the cap 91 and stem 92. A gap 128 between the peg 126 and well 127 permits limited relative pivotal movement so the ring pad 104 can always seat firmly, for example, without tilting the stem 92.

The valve arrangement 44 also contains a secondary valve assembly 135. The secondary valve assembly 135 includes a cup-shaped insert 136 seated snugly in a vertical passage 137 extending parallel to the axis of the bore 60 mounting the main valve assembly 61. The downwardly facing open mouth 138 of the insert 136 is tapered around its edge and rests against an O-ring 139 seated in the base of the passage 137 in surrounding relationship with a smaller vertical passage 140 providing access to the insert 136 from a horizontal transfer passage 141. The passage 141 extends into communication with the bore 60, immediately above the neck 70 on the collar 66.

A ball core 145 formed of a light weight material, such as Teflon or the like, and having a density greater than that of the acid is disposed within the insert 136. The ball core 145 is free to move between an upper position seated against a tripod of protrusions 147 in the top 148 of the insert 136, and a lower position seated in sealing relationship on the O-ring 139.

Immediately above the ball core 145 in the top 148 of the insert 136 is an orifice 154. The orifice 154 provides fluid communication between the inside of the insert 136 and a transversely extending passage 155 in the valve body 50. The passage 155, in turn, extends into communication with a vertical passage 156 running downwardly in the valve body 50 into the chamber 100A.

The O-ring 139, ball core 145, and cup-shaped insert 136 are inserted into the passage 137 through a threaded aperture 160 (with its cap 161 removed), which is encircled by an O-ring seal 162. The cap 161 is then threaded into place, as illustrated whereupon its lower surface 165 seats tightly against a radially disposed series of three legs 166 extending upwardly from the top 148 of the insert 136.

In operation of the water conditioning system incorporating the valve arrangement 44 embodying features of the present invention, during normal service softening there is a slight positive liquid pressure maintained in the tube 45. This positive pressure is effective on the main valve core 90 to force it downwardly into its lower position, against the bias of the coil spring 110. The ring pad 104 seats against its seat 105 to seal the lower chamber 100B off from the transverse passage 141 to the valve assembly 135. At the same time, this slight positive fluid pressure is effective within the secondary valve assembly insert 136 through the orifice 154 to seat the ball element 145 tightly against the O-ring 139. Treated service water in the tube 45 is thus unable to enter the container 35 which is filled to a level above the valve arrangement 44 with the acid solution hereinbefore referred to.

As seen in FIGURE 3, however, the acid solution in the container 35 does have access to the metering bulb 80 through the radial passages 54 in the skirt 53 of the valve body, the foam filter 58, the unsealed gap between the collar bore 120 and the stem 92 of the main valve core 90, the radial passage 86 in the neck of the collar, the annular channel 75 surrounding the neck, the port 76 through the valve body, and the fitting 77 and elbow 78. The head of acid solution forces it into the bulb 80, assisted by the natural suction of the rubber bulb seeking to assume its original expanded shape, during the service cycle. In this light, the bulb 80 is initially evacuated of air by squeezing it when the acid solution is originally introduced to the container 35. Subsequently, as will hereinafter become more clear, the bulb 80 collapses again when acid is removed from it during the regeneration cycle.

When the main valve 12 calls for regeneration, a pressure slightly less than atmospheric pressure is developed in the tube 45. The effective force holding the valve core 90 downwardly in its lower position, as illustrated in FIGURE 3, is removed, and the coil spring 110 is effective to move the core into its upper position, as illustrated in FIGURE 4. The sealing lip 117 moves into sealing relationship with the annular inner surface 120 in the collar 66, and the acid solution is effectively sealed off from the metering bulb 80.

At the same time, the slight vacuum in the tube 45 is effective in the secondary valve assembly insert 136 through the orifice 154 to lift the light ball core 145 off the valve seat 139. The core 145 rises upwardly under the influence of this negative pressure or suction to seat against the three-pronged seat 147 in the top 148 of the insert 136.

The reduced pressure is thus effective through the passages 140 and 141, the lower chamber 100B, the port 76, and the elbow 78 into the metering bulb 80. Acid solution is drawn from the bulb 80 along the path indicated by arrows in FIGURE 4, into the tube 45. Because the valve assembly 135 offers virtually no resistance to acid flow, the flow is virtually unrestricted. This acid solution mixes with brine in the aspirator valve 20 and is passed through the resin particles in the resin tank 16 in the manner hereinbefore discussed.

The flexible rubber metering bulb 80 collapses as solution is drawn from it. The amount of acid solution it contains is that amount desirable for a prescribed regeneration program. When the bulb is completely collapsed, and, accordingly, emptied of acid solution, metering of the acid solution into the regenerating brine is obviously halted. As will be recognized, the metered amount of acid solution can be varied by varying the size of the metering bulb 80.

Immediately upon the regeneration cycle being completed, under direction of the main valve 12, positive pressure again is effective in the tube 45. This positive pressure forces water through the orifice 154 against the top of the ball core 145 and immediately seats it tightly against the O-ring 139, sealing the upper chamber 100A off from the lower chamber 100B. The positive pressure is then immediately effective to force the valve core 90 down into its first position, as illustrated in FIGURE 3, and the metering bulb 80 once more fills with acid solution from the reservoir container 35.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. In a water conditioning system wherein water to be treated is contacted with ion exchange material during a service cycle and the material is regenerated with an acid solution and a brine solution during a regeneration cycle, the acid solution being supplied from the acid reservoir of an acid dispensing unit through a liquid supply line in which normal pressure is reduced to a relatively lower pressure by pressure reducing means during regeneration, an improvement in acid metering valve arrangement, comprising:
- (a) a valve body in said reservoir adapted to be immersed in said acid solution,
- (b) a metering chamber,
- (c) valve bore means in said body and movable valve core means in said bore means defining a first chamber and a second chamber therein,
- (d) first fluid communication means connecting said first chamber with said supply line,
- (e) second fluid communication means connecting said second chamber with said metering chamber,
- (f) third fluid communication means connecting said second chamber with the reservoir,
- (g) by-pass passage means connecting said first chamber with said second chamber past said valve core means,
- (h) valve element means in said by-pass passage means for opening and closing communication between said first chamber and said second chamber,
- (i) said valve core means being movable between a first position wherein said second chamber is in communication with said reservoir and said metering chamber so that acid solution enters said metering chamber and a second position wherein communication between said second chamber and said reservoir is closed while said metering chamber remains in communication with said second chamber and said valve element means opens said by-pass passage means in response to the relatively lower pressure to place said second chamber in communication with said first chamber so that acid solution from said metering chamber is metered through said valve arrangement to said supply line.

2. The improvement in metering valve arrangement of claim 1 further characterized in that:
- (a) said valve element means comprises a ball member fabricated of material which is relatively light but denser than the acid solution,
- (b) said ball member is adapted to seat against a valve seat encircling said by-pass passage when said normal pressure is effective on said ball member opposite said seat in said by-pass passage so that communication between said first chamber and said second chamber is closed.

3. The improvement in metering valve arrangement of claim 2 further characterized in that:
- (a) when normal pressure is reinstated in said passage after regeneration, a stream of liquid is directed against said ball member through an orifice axially aligned with ball member and said valve seat and tends to seat said ball.

4. The improvement in metering valve arrangement of claim 3 further characterized in that:
- (a) said ball member is disposed in a removable inverted cup element in said by-pass passage,
- (b) said orifice being formed in the base of said cup element.

5. The improvement in metering valve arrangement of claim 1 further characterized in that:
- (a) said valve core means includes a cap and a stem,
- (b) said cap having an annular rim and a sealing lip at said rim,
- (c) said sealing lip forming a seal between said first chamber and said second chamber.

6. The improvement in metering valve arrangement of claim 5 further characterized by and including:
- (a) a retaining collar seated in said valve core means opposite said first chamber from said cap and encircling said stem,
- (b) said stem having an annular sealing lip formed thereon for forming a seal between said stem and said collar to close said second chamber to said reservoir when said valve core means is in its second position and open said second chamber to said reservoir when said valve core means is in said first position.

7. The improvement in metering valve arrangement of claim 1 further characterized in that:
- (a) said metering chamber is defined by a bulb fabricated of flexible resilient material.

8. The improvement in metering valve arrangement of claim 7 further characterized in that:
- (a) said flexible, resilient metering bulb is positioned to facilitate squeezing and constructed so that will automatically expand to draw acid solution into said bulb.

9. The improvement in metering valve arrangement of claim 1 further characterized in that:
- (a) said valve body has peripheral skirt means formed on its lower end,
- (b) said third fluid communication means including apertures formed in said skirt means.

References Cited
UNITED STATES PATENTS

| | | | |
|---|---|---|---|
| 2,685,985 | 8/1954 | Howell | 222—207 X |
| 2,988,107 | 6/1961 | Rudelick. | |
| 3,229,854 | 1/1966 | Turnquist. | |
| 3,306,450 | 2/1967 | Kryzer et al. | 210—134 |
| 3,306,504 | 2/1967 | Tischler | 210—136 X |
| 3,325,012 | 6/1967 | Kryzer et al. | 210—134 X |

SAMIH N. ZAHARNA, Primary Examiner

C. M. DITLOW, Assistant Examiner

U.S. Cl. X.R.

210—136, 191; 222—335

PO-1050 (5/69)

UNITED STATES PATENT OFFICE
CERTIFICATE OF CORRECTION

Patent No. 3,487,933      Dated January 6, 1970

Inventor(s) J. K. Hood, E. J. Tischler and E. Grout

It is certified that error appears in the above-identified patent and that said Letters Patent are hereby corrected as shown below:

Column 3, line 27, "serivce" should be --service--

Column 4, line 27, change "the" to --and--

Column 4, line 63, change "annuar" to --annular--

Column 4, line 67, "he" should be --the--

Column 5, line 10, change "transvese" to --transverse--

Column 7, line 51, after "with" insert --said--

Column 8, line 14, change "core" to --bore--

SIGNED AND
SEALED
AUG 11 1970

(SEAL)
Attest:

Edward M. Fletcher, Jr.
Attesting Officer

WILLIAM E. SCHUYLER, JR.
Commissioner of Patents